United States Patent
Gonder et al.

(10) Patent No.: US 8,434,118 B2
(45) Date of Patent: Apr. 30, 2013

(54) PLAYLIST MENU NAVIGATION

(75) Inventors: Thomas L. Gonder, Westminster, CO (US); John B. Carlucci, Boulder, CO (US); John A. Stebbins, Golden, CO (US); Steven E. Riedl, Superior, CO (US); Vipul B. Patel, Upper Holland, PA (US)

(73) Assignee: Time Warner Cable Enterprises LLC, New York, NY (US)

( * ) Notice: Subject to any disclaimer, the term of this patent is extended or adjusted under 35 U.S.C. 154(b) by 1566 days.

(21) Appl. No.: 10/856,383

(22) Filed: May 27, 2004

(65) Prior Publication Data

US 2005/0278761 A1 Dec. 15, 2005

(51) Int. Cl.
H04N 7/173 (2011.01)

(52) U.S. Cl.
USPC .......................................................... 725/87

(58) Field of Classification Search .................... 725/49, 725/61, 91, 93, 95, 112, 134
See application file for complete search history.

(56) References Cited

U.S. PATENT DOCUMENTS

| | | | |
|---|---|---|---|
| 5,623,613 A * | 4/1997 | Rowe et al. ................... | 715/841 |
| 5,862,312 A | 1/1999 | Mann et al. | |
| 5,996,089 A | 11/1999 | Mann et al. | |
| 6,321,345 B1 | 11/2001 | Mann et al. | |
| 6,449,248 B1 | 9/2002 | Trasatti et al. | |
| 6,449,730 B2 | 9/2002 | Mann et al. | |
| 6,557,114 B2 | 4/2003 | Mann et al. | |
| 6,567,926 B2 | 5/2003 | Mann et al. | |
| 6,574,745 B2 | 6/2003 | Mann et al. | |
| 6,642,939 B1 * | 11/2003 | Vallone et al. ................ | 715/721 |
| 6,754,439 B1 | 6/2004 | Hensley et al. | |
| 7,124,424 B2 * | 10/2006 | Gordon et al. ................... | 725/43 |
| 2001/0014975 A1 | 8/2001 | Gordon et al. | |
| 2002/0032882 A1 | 3/2002 | Mann et al. | |
| 2002/0059394 A1 | 5/2002 | Sanders | |
| 2003/0002862 A1 * | 1/2003 | Rodriguez et al. ............ | 386/125 |
| 2003/0191983 A1 | 10/2003 | Mann et al. | |
| 2004/0015986 A1 | 1/2004 | Carver et al. | |
| 2004/0078822 A1 * | 4/2004 | Breen et al. ...................... | 725/86 |
| 2005/0005308 A1 * | 1/2005 | Logan et al. ................... | 725/135 |
| 2005/0060745 A1 | 3/2005 | Riedl et al. | |
| 2005/0166017 A1 | 7/2005 | Mann et al. | |
| 2006/0112434 A1 * | 5/2006 | Banker et al. .................... | 726/27 |
| 2006/0259940 A1 * | 11/2006 | Fries ............................. | 725/131 |

OTHER PUBLICATIONS

"Concurrent Files Patent for Technology that Enables Broadband Operators to Improve VOD Marketing by Using Video to Sell More On-Demand Content," Press Release, Apr. 30, 2004, Concurrent Computer Corporation, Duluth, USA.

* cited by examiner

Primary Examiner — Vivek Srivastava
Assistant Examiner — Alfonso Castro
(74) Attorney, Agent, or Firm — Otterstedt, Ellenbogen & Kammer, LLP

(57) ABSTRACT

In one embodiment, a method of operating a communications system is disclosed comprising receiving a request for establishment of a session from a terminal, establishing the session with the terminal, and providing at least one navigation video segment to the terminal, via the session. The communications system may be a source of programming, such as a cable system, and the terminal may be a set-top terminal coupled to a display device. The navigation video segment may be used by the terminal to create selection menus to be displayed for user navigation. The video segments may be rich media video segments. A playlist may be generated comprising an indexed listing of a plurality of available video segments. The playlist may facilitate retrieval of video segments requested by a terminal. Communications systems, terminals and methods of operating a terminal are disclosed, as well.

40 Claims, 8 Drawing Sheets

FIG. 8

```
[Catalog ID: 1] HBO
          [Catalog ID: 2] Movies
                    Two Weeks Notice
                    Terminator 3
                    Harry Potter
          [Catalog ID: 4] Series
                    [Catalog ID: 5] Sex and the City
                              Episode 1
                              Episode 2
                              Episode 3
                    [Catalog ID: 7] Sopranos
                         ...
                    [Catalog ID: 8] The Wire
                         ...
          [Catalog ID: 6] Sports
                    Event 1
                    Event 2
                    Event 3
          [Catalog ID: 9] Extras
                    ...
```

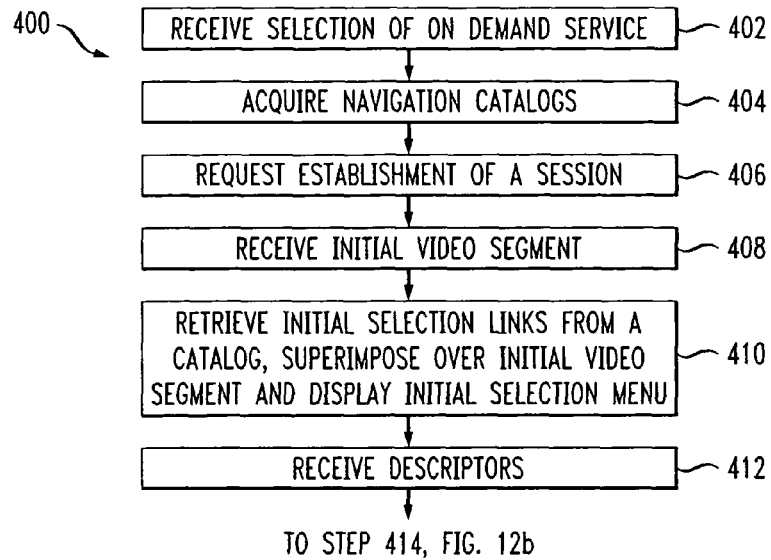

PLAYLIST MENU NAVIGATION

FIELD OF THE INVENTION

The invention relates generally to a communications system and method and, more particularly, to a system and method for providing programming content on demand, through a communications network, such as a cable system.

BACKGROUND OF THE INVENTION

Broadcast of entertainment programming content, such as TV programs, over broadband communications networks, such as cable networks, is well known. As a matter of fact, the amount of programming content delivered over such networks is ever increasing. At the same time, the number and types of cable services, such as Video On Demand ("VOD"), movie-On Demand ("MOD"), subscription VOD ("SVOD"), free on demand ("FOD") and pay per view ("PPV"), etc., introduced to enhance a user's program enjoyment, are ever growing. The array of such features has become diverse in nature, and in some instances complex.

User's of on demand services typically navigate through a series of selection menus displayed on a television screen by a set-top terminal to locate and request a desired program. Each selection menu has different selection links. The selection links may be provided to the set-top terminal by a cable system offering the on demand services, via a broadcast file system server carousel for example. The carousel may continuously and serially provide files containing selection links for all the available services provided by the cable system. The set-top terminal may retrieve the appropriate files from the carousel after a service is selected by a user. Typically, the selection links are displayed on a blank or colored screen. There is limited, if any, graphics provided, since the carousel is generally too slow.

SUMMARY OF THE INVENTION

In accordance with embodiments of the invention, video segments, which may include media rich graphics, are provided to a terminal coupled to a display device, such as a television, during a session between a communications system and the terminal. Selection links may be superimposed over the video segments to form selection menus for user navigation of a service, such as an on demand service. The terminal may be a set-top terminal, for example. The media rich video graphics may include video, music, audio voiceover, animated text, etc. Establishing a session to provide the navigation video segments enables such media rich video segments to be readily conveyed to the terminal from the communications system. The communications system may be a cable system offering multiple on demand services for selection by a user, as well as conventional television programming services, for example. Each on demand or other such service may provide their own, unique video segments to the cable system, for conveyance to the terminal when a particular service is selected by a user. One or more selection menus of the same service may also have their own unique, video segment providing a unique background signature. For example, if the service offers episodes of different television series, the selection menu for each series may have a unique video segment displayed as part of the selection menu. The selection menus may also include descriptive information related to the particular selection options. For example, if the selection options relate to episodes of a program, the descriptive information may include a short description of each episode.

Selection links for the selection menus may be provided to the terminal via an out of band channel in files, referred to as navigation catalogs. The navigation catalogs are related to enable the terminal to retrieve the proper selection links for a selection screen as a user navigates through the available options to select a program. The selection links are superimposed over the applicable video segment to form the selection screen. The video segments available for a particular on demand service may be indexed in a playlist in the cable system. Descriptors correlating navigation catalogs with the indexed video segments are provided to the terminal, enabling the terminal to request a particular video segment, based on selections of the user.

As used herein, the term "terminal" encompasses hardware or software that acts as an interface between a display device, such as a TV, and cable system or other such communications system, and controls operation of the display device. The terminal may be separate from and coupled to the display device, or may be part of or include the display device. The use of the terms "terminal" and "set-top terminal" encompasses devices also referred to as set-top boxes and clients.

In accordance with one embodiment of the invention, a method of operating a communications system to provide navigation video segments to a terminal for display as part of a selection menu is disclosed. The method comprises receiving a request for establishment of a session from a terminal, establishing a session with the terminal, and providing at least one navigation video segment to the terminal via the session, for display with at least one selection menu. Establishment of a session may comprise allocating bandwidth for communication with the terminal. The method may further comprise generating a playlist comprising an indexed listing of the plurality of available navigation video segments. The playlist may comprise pointers to storage locations of the video segments. The playlist may be indexed by normal play time (NPT), for example. A descriptor may be provided for each available navigation video segment to the terminal, wherein each descriptor comprises an identification of an index value of a respective navigation video segment. At least one navigation catalog comprising at least one selection link for at least one respective selection menu, may be provided to the terminal. Descriptive information related to a selection link may be included in the navigation catalog. The descriptor for each available video segment may further comprise an identification of a navigation catalog containing selection links to be used with a respective navigation video segment. The navigation catalogs may be provided to the terminal via a carousel, for example. A request may be received for a navigation video segment from the terminal, comprising the indexed value. The communications system may provide at least one on demand service to the terminal.

In accordance with a related embodiment, a communications system is disclosed comprising a processor and memory coupled to the processor. The memory stores at least one navigation video segment for display with a selection menu. The processor is programmed to establish a session with a terminal upon request by the terminal and to provide at least one navigation video segment to the terminal via the session. The processor may be programmed to establish the session by, at least in part, allocating bandwidth for communication with the terminal. The processor may be further programmed to generate a playlist comprising an indexed listing of the plurality of navigation video segments. The system may further comprise a first server and a second server in communication with the first server. The navigation video segments are stored by the second server and the first server may be programmed to generate the playlist and provide the playlist to the second server. The second server may be programmed to identify a requested navigation video segment from the playlist, retrieve the requested navigation video segment, and provide the requested navigation video segment to the terminal via the session. The system may further comprise a third server programmed to provide navigation catalogs to the terminal via a carousel. The processor may be further programmed to provide a descriptor for each available navigation video segment to the terminal. The processor may also be programmed to provide navigation catalogs comprising selection links for respective selection menus, to the terminal.

In accordance with another embodiment of the invention, a terminal to receive programming from a source and to display the programming on a display is disclosed comprising a processor and memory coupled to the processor. The processor is programmed to request establishment of a session between a program source and the terminal and store in memory at least one navigation video segment received via the session for use with at least one selection menu to be displayed on the display device. The processor may be further programmed to tune to a bandwidth allocated during establishment of the session, to receive the at least one navigation video segment. The processor may be further programmed to generate a selection menu comprising the navigation video segment. The selection menu may be generated by superimposing at least one selection link over the navigation video segment during generation of the selection menu. At least one navigation catalog, comprising at least one selection link for the respective selection menu, may be received.

At least one descriptor may be received by the terminal, from the program source, for example, to identify at least one respective navigation video segment. The processor may be programmed to request at least one respective navigation video segment from the program source based on the descriptor. The program source may be a cable system, for example. The terminal may receive a plurality of descriptors from the source for a respective plurality of navigation video segments. The processor may be further programmed to identify one of the plurality of descriptors, request a navigation video segment identified by the one of the plurality of descriptors, retrieve at least one selection link to be superimposed over the navigation video segment, superimpose the selection link over the received navigation video segment to generate a selection menu, and display the generated selection menu. The processor may be programmed to identify the descriptor based on a user's selection of a selection link on a displayed selection menu. The selection link may be retrieved from one of a plurality of navigation catalogs stored by the terminal and each of the plurality of navigation catalogs may be associated with a respective descriptor.

In a related embodiment, a method of operating a terminal coupled to a communications system and a display device is disclosed comprising requesting establishment of a session with the communications system, receiving at least one navigation video segment via the session, and causing display of the at least one navigation video segment with at least one selection menu on the display device. The method may further comprise generating the at least one selection menu by superimposing at least one selection link over a respective navigation video segment and displaying the selection menu.

BRIEF DESCRIPTION OF THE FIGURES

FIG. 8 is an example of a group navigation catalog for HBO On Demand service, which contains the navigation catalogs containing the selection options and descriptive material for HBO On Demand selection menus, such as the selection menus of FIGS. 4, 6 and 7;

FIGS. 12a and 12b is an example of a method of operating a terminal coupled to a display device, such as a set-up terminal coupled to a TV, in accordance with an embodiment of the invention.

DETAILED DESCRIPTION OF THE PREFERRED EMBODIMENTS

In accordance with embodiments of the present invention, navigation graphics, such as media rich graphics, to be displayed in association with navigation selection menus, are provided by a communications system to a terminal during a session between the terminal and the communications system. The terminal may be a set-top terminal coupled to a display device, such as a television ("TV"), for example. The communications system may be a cable system providing one or more on demand services and other services that may present selection options via selection menus. The cable system may offer conventional television and cable services as well. The media rich graphics may include video, music, audio voiceover, animated text, etc. Selection links of selection menus may be provided to the terminal in an out of band channel in files, referred to as navigation catalogs. The navigation catalogs may be related so that the terminal may create appropriate selection menus as a user navigates through the selection links to select a program. The selection links may be superimposed over the video segments to form the selection menus. The video segments available for a particular on demand service may be indexed in a playlist in the cable system. Descriptors correlating navigation catalogs with the indexed video segments are provided to the terminal, enabling the terminal to request a particular video segment, based on selections of the user.

Figure 1:
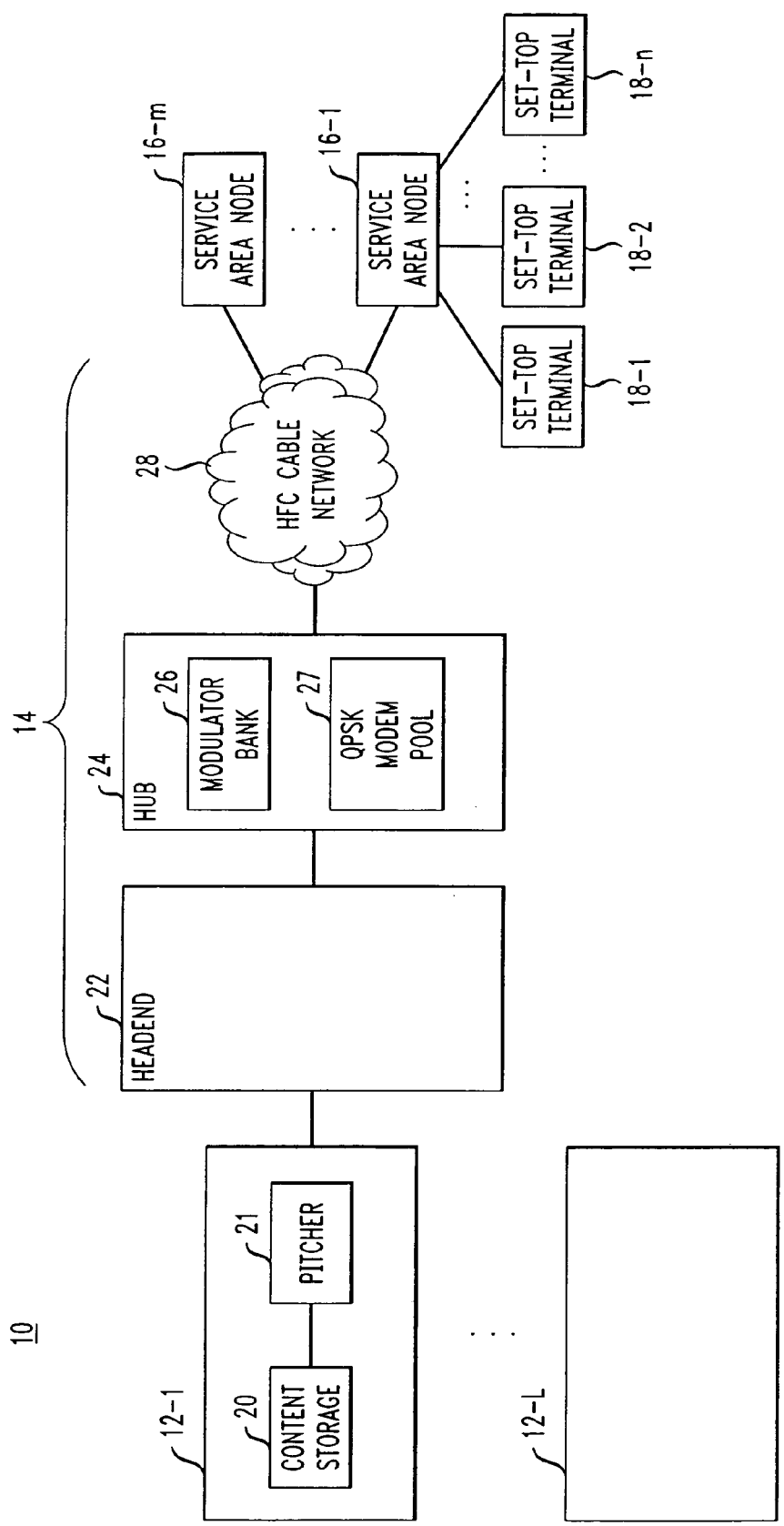
FIG. 1 is a block diagram of certain components of a broadband communications system including a cable system, embodying principles of an embodiment of the invention.

FIG. 1 is a block diagram of certain components of a broadband communications system 10 embodying principles of an embodiment of the invention. The system includes one or more program sources 12-1 through 12-L, where L is a number, a cable system 14 and a plurality of service area nodes 16-1 through 16-m in a neighborhood. Service area nodes 16-1 through 16-m, where m is a number, are coupled to set-top terminals that are coupled to users' televisions ("TV's"). Service area node 16-1, for example, is coupled to set-top terminals 18-1 through 18-n, where n is a number. Cable system 14 delivers information and entertainment services to users' televisions (TV's), for example, via the set-top terminals 18-1 through 18-n. Service area nodes 16-1 through 16-m and/or set-top terminals 18-1 through 18-n may or may not be part of the cable system 14. The broadband communications system 10 may be configured to operate in accordance with the Interactive Service Architecture ("ISA") developed by Time Warner Cable, Inc., New York, N.Y., for example. The ISA is described at www.is a.tv.

Sources 12-1 through 12-L create programming in manners known in the art, store the programming in a content storage 20 and broadcast or "pitch" the programming to cable system 14 through a pitcher 21, for example. A pitcher is a transmitter in an Asset Distribution Interface ("ADI") distribution path in the ISA, as described in VOD MD-SP-VOD-Content Specification 101-020327, Mar. 27, 2003 and VOD Content Specification MD-SP-ADI 1-1-102-030415, Apr. 15, 2003, for example, which are incorporated by reference herein. The programming provided to an on demand system may include movies and previously broadcast television shows, for example. In this example, the sources 12-1 through 12-L format the programming in ADI format for transmission by the pitcher 21.

The sources 12-1 through 12-L include analog and digital satellite sources, such as HBO, Turner Broadcasting System and MTV, for example, which typically provide the traditional forms of television broadcast programs and information services. The sources 12-1 through 12-L may also include satellite on demand sources, such as HBO On Demand. The sources 12-1 through 12-L also include terrestrial broadcasters, such as broadcast networks, such as CBS, NBC, ABC, etc., for example. Although specific examples of programs and services that may be provided by the aforementioned sources are given herein, other programs and services may also be provided by these or other sources without departing from the spirit and scope of the invention.

In addition to providing program content, any or all of the sources 12-1 through 12-L may provide navigation video segments comprising media rich graphics such as video, music, audio voiceover, animated text, etc. to the cable system 14 via the pitcher 21. The navigation video segments are provided to set-top terminals, such as set-top terminal 18-1, to be associated with selection links also provided to the set-top terminal 18-1, to form selection menus in accordance with embodiments of the invention, as discussed further below.

Figure 2:
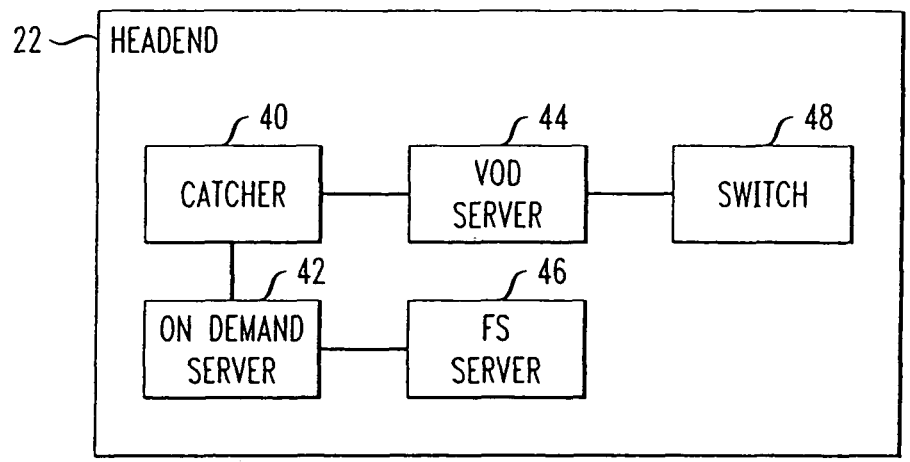
FIG. 2 is a block diagram of certain of the components of the headend of the cable system of FIG. 1, which are relevant to embodiments of the invention.

The cable system 14 comprises a headend 22, a hub 24 and a hybrid fiber coaxial ("HFC") cable network 28. Assets pitched by the sources 12-1 through 12-L are processed in a conventional manner by the headend 22 and stored. FIG. 2 is a block diagram of certain of the components of the headend 22 that are relevant to the embodiments of the invention. The headend 22 includes, in part, a catcher 40, which is a receiver in the ADI distribution path, an On Demand Server 42, a Video On Demand ("VOD") Server 44 and a File System ("FS") Server 46. The catcher 40 receives the on demand program content, including on demand navigation video segments and metadata providing information about the content, "pitched" by the pitcher 21 of the sources 12-1 through 12-l. The catcher 40 then notifies the On Demand Server 42 of the identity of the received content, based on metadata associated with the content. The content may be processed by the headend 22 into assets for storage by the VOD Server 44. An "asset" is an aggregation of video and audio. Metadata describing the content of one or more assets is combined with one or more assets into "packages." Assets may contain the content or references to the content, which may be stored as another asset. The VOD Server 44 may comprise one or more types of data stores known in the art, such as a relational database, an object oriented database, a hybrid object-relational database, or simply as files in a video optimized or typical file system known in the art.

The On Demand Server 42 prepares files based on the metadata associated with the received assets, referred to as catalogs, which are stored on the FS Server 46, as discussed further below. The catalogs contain information for use by the set-top terminals 18-1 through 18-n, such as electronic program guide information, formatting information selection links for user navigation and/or descriptive material related to the selection links, for example. The FS Server 46 allows set-top terminals 18-1 through 18-n to read/acquire the files or catalogs from a broadcast stream as if they were local catalogs. In general, the FS Server 46 is used to "trickle," or disseminate piecemeal, catalogs to the set-top terminals 18-1 through 18-n. To that end, the FS Server 46 applies a well known "data carousel" mechanism to periodically provide navigation catalogs onto the broadcast stream to the set-top terminals 18-1 through 18-n. The set-top terminals 18-1 through 18-n retrieve the navigation catalogs associated with a selected on demand service from the carousel, as is described further below. The FS Server 46 may operate in accordance with a Broadcast File System (BFS) or an Open Cable Applications Platform (OCAP) Protocol, which are well known in the art. Catalogs may also be provided via an internet protocol (IP) request/response gateway (not shown).

A program available on demand and requested by a user is transmitted as a data stream through a transmission channel having a specified frequency band. It should be noted that the term "transmission channel" should not be confused with a "program channel." A "transmission channel" signifies a designated frequency band through which a data stream is transmitted. On the other hand, a "program channel" signifies the source of the program material selected by a user to view. For example, a user may select program channel 2 to view program material provided by CBS, program channel 14 to view program material provided by ESPN, program channel 55 to view program material provided by HBO On Demand, etc. In this illustrative embodiment, the transmission channels may be 6 MHz bands populating a forward passband, e.g., 350-750 MHz band, of a coaxial cable, which is allocated for downstream communication from headend 22 to a set-top terminal 18-1 through 18-n.

Returning to FIG. 1, the FS carousel and program signal data streams of the requested programs are typically transmitted from the headend 22 to the hub 24 via Internet Protocol ("IP") transport over optical fiber. The program signal streams may also be transmitted as intermediate frequency signals that have been amplitude modulated ("AM") or as a digital video broadcast (DVB) asynchronous serial interface (ASI) that has also been AM modulated. The hub 24 includes a modulator bank 26 and a quaternary phase shift keying ("QPSK") modem pool 27, among other components. The modulator bank 26 includes multiple modulators, each of which is used to modulate data streams comprising the carousel and program assets onto different carriers. By using a 256-quadrature-amplitude-modulation (256-QAM) technique and 6 MHz transmission channel, each modulator in the modulator bank 26 in this instance may modulate up to 9 data streams, multiplexed in a transport stream, onto the corresponding carrier. The resulting modulated carrier is transmitted through the transmission channel associated with the carrier. The On Demand Server 42 causes switching unit 48 to switch the data stream containing a requested program to appropriate modulators in the modulation bank 26. The modulated carrier traverses the transmission channel associated therewith in HFC cable network 28.

The QPSK modem pool 27 modulates data streams onto out of band channels. Communications from the set-top terminals 18-1 through 18-n to the headend 22 may be conveyed via a reverse passband of 5-40 MHz band of a coaxial cable, for example. The reverse passband comprises reverse data channels ("RDCs") having a 1 MHz bandwidth, for example, through which QPSK signals containing the data are transmitted.

Certain communications from the headend 22 to the set-top terminals 18-1 through 18-L may also be conveyed via out of band, forward data channels ("FDCs"), through the QPSK modem pool 27. FDCs may occupy the 70-130 MHz band of a coaxial cable, for example. QPSK signals containing system messages to a set-top terminal 18-1 through 18-L may be transmitted through an FDC having a 1 MHz bandwidth, for example.

Available programs are stored as assets in the headend 22, such as in the VOD Server 44, so that the users at the set-top terminals 18-1 through 18-n may request programming on demand and manipulate (e.g., pause, fast-forward or rewind) the programming content in the recorded streams. Program manipulation is described in co-pending, commonly assigned application Ser. No. 10/263,015 ("the '015 application"), filed Oct. 2, 2002, for example, which is incorporated by reference herein.

Figure 3:
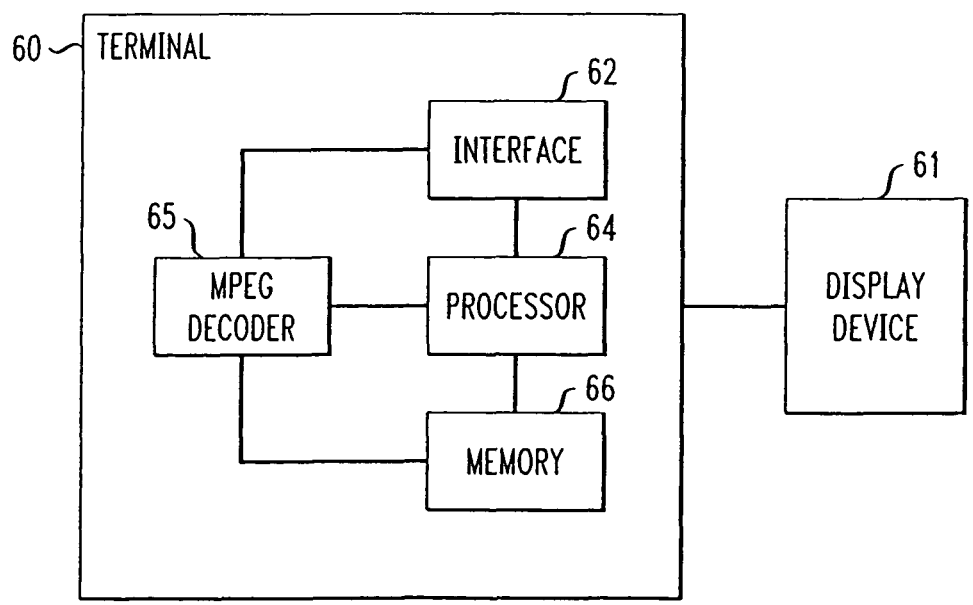
FIG. 3 is an example of a terminal, which is representative of one of the set-top terminals of FIG. 1.

FIG. 3 is an example of a terminal 60, which is representative of one of the set-top terminals 18-1 through 18-n of FIG. 1. The terminal 60 is typically coupled to a display device 61, such as a television, at a user location. The terminal 60 comprises, in part, an interface 62, a processor 64, an MPEG decoder 65 and memory 66. A program signal stream broadcast by the headend 22 is received by the interface, decoded by the MPEG decoder 65 and provided to the display device 61. The memory may be hard drive of the terminal, for example. The terminal is hardware or software that acts as an interface between a display device, such as a TV, and cable system 14 or other such communications system, and controls operation of the display device 61. The terminal may be separate from and coupled to the display device 61, or may be part of or include the display device. The use of the terms "terminal" and "set-top terminal" encompasses devices also referred to as set-top boxes and clients.

During operation, a user operating a terminal, such as the set-top terminal 18-1 coupled to the display device 61, such as a TV (not shown), selects an on demand service, such as HBO On Demand, by selecting an appropriate channel on the terminal. The selection is typically made via a hand operated interface device, such as a remote control (not shown). The terminal requests that a session be established with the headend 22, based on the service selected by the user via the set-top terminal 18-1. A session is established with the headend 22 in accordance with a session set up protocol ("SSP"), for example, as is known in the art. The On Demand Server 42 configures the VOD Server 44 to allocate bandwidth to communicate with the terminal 18-1. In accordance with embodiments of the invention, navigation video segments to be used in conjunction with selection menus for user navigation are provided over the allocated bandwidth. The On Demand Server 42 informs the set-top terminal 18-1 of the frequency of the allocated bandwidth, via an out of band, FDC channel, so that the terminal can tune to that frequency to receive the navigation video segments. This process is referred to as establishing a "session."

In the meantime, the set-top terminal 18-1 retrieves the appropriate navigation catalogs for the selected on demand service from the carousel of the FS Server 46. The navigation catalogs for all the services available through the cable system 14 providing selection menus are provided on the carousel via an FDC channel. In one example, the set-top terminal 18-1 acquires a code or descriptor for the navigation catalogs for the selected service from a Service Table (PSP ST) entry for the selected service, enabling the appropriate catalogs to be retrieved from the carousel. The set-top terminal 18-1 stores the retrieved navigation catalogs in the memory 66. The set-top terminal 18-1 constructs selection menus for the user to navigate to a desired program, based on selection links provided in the navigation catalogs, as described further below.

Figure 4:
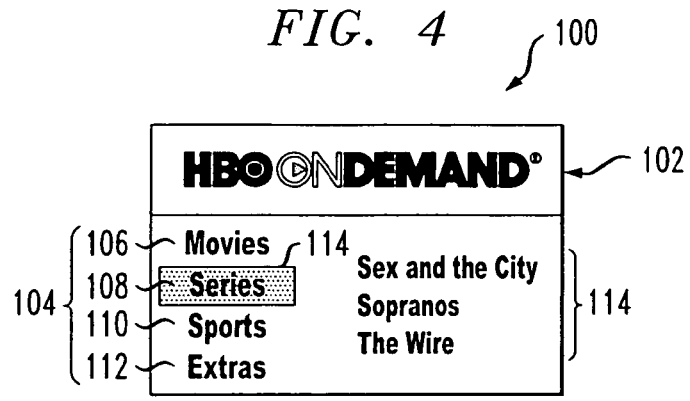
FIG. 4 is an example of a selection menu that may be provided in a user interface on a user's display device, such as a TV, in accordance with embodiments of the invention.
Figure 6:
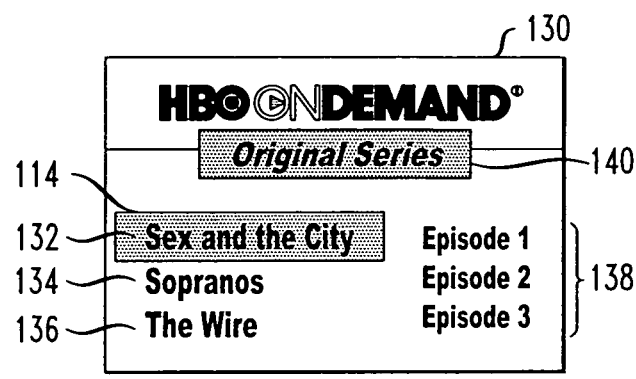
FIGS. 6 and 7 are additional examples of selection menus.
Figure 7:
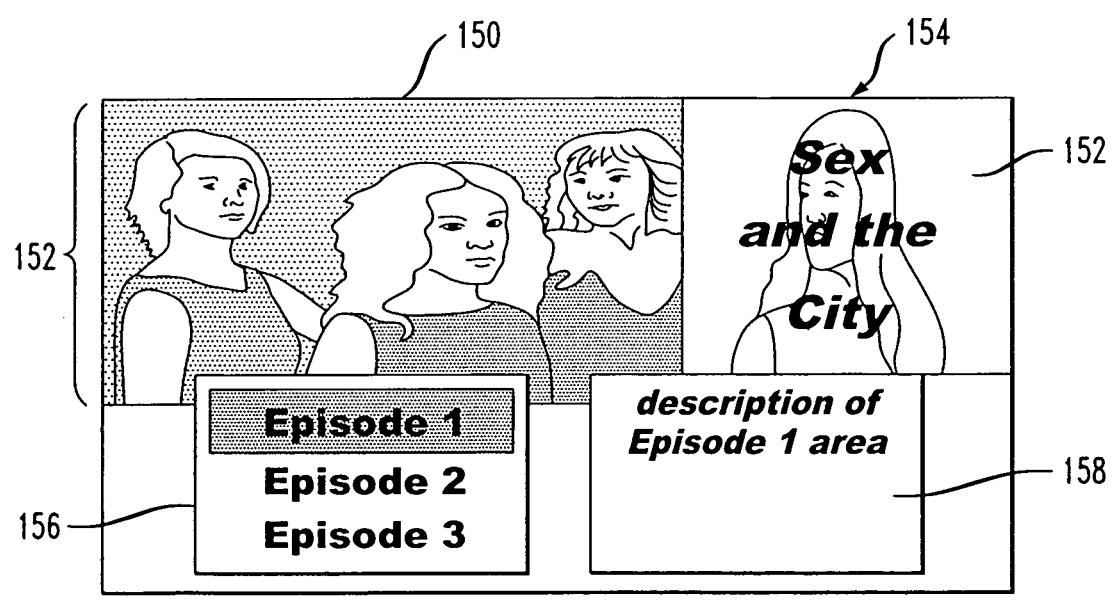

FIGS. 4, 6 and 7 are examples of selection menus that may be provided in a user interface on a user's display device 61, such as a TV, in accordance with embodiments of the invention. FIG. 4 is an example of an initial selection screen 100 that may be presented upon selection of HBO On Demand. The opening screen 100 comprises a logo section 102, a selection section 104 of links 106 through 112 for selection of Movies, Series, Sports and Extras, respectively, and a display section 114. The Series 108 refers to television series. Extras refers to supplemental programming, such as "the making of" a particular programs, for example. A selection cursor 114 is shown positioned over the selection link 106 for Series, causing display of the Series available for selection, in this example Sex and the City, Sopranos and The Wire. If the selection cursor 114 is positioned over the Movies link 104, for example, the available movies would be displayed in the display section 114.

Figure 5A:
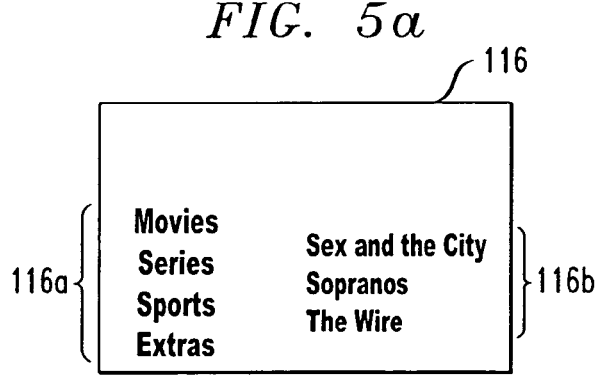
FIGS. 5a and 5b are selection links and a video segment, respectively, which are superimposed to form the selection menu of FIG. 4.
Figure 5B:
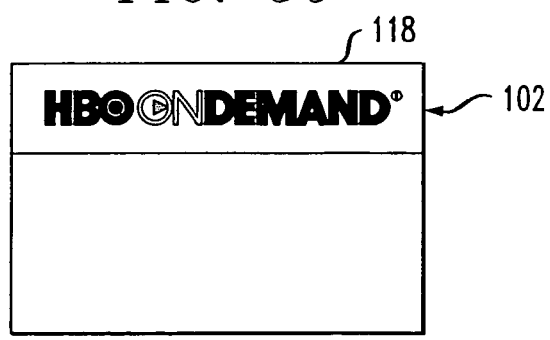

The initial selection screen 100 is constructed from a selection screen 116 comprising selections 116a, 116b, shown in FIG. 5a and a video segment 118, shown in FIG. 5b. In this example, the video segment 118 comprises the logo section 102 in stylized text and background in multiple colors. As mentioned above, the video segment may comprise video, audio, animated text, etc. The selections 116a, 116b are derived from a navigation catalog provided by the FS Server 46 and stored in the memory 66 of the set-top terminal 18-1, as discussed below. The video segment 118 is provided by the VOD Server 44, and is decoded by the MPEG decoder 65. The selection screen 116 of FIG. 5a is superimposed over the video segment 118 of FIG. 5b by the processor 64 to form the selection menu 100 of FIG. 4. If the selection cursor 114 is positioned over the Movies link 106 instead of Series 108 in FIG. 4, then the selections 116b would be different.

Selection of the Series link 108 causes display of the Series selection menu 130 of FIG. 6. The selection menu 130 comprises selection links 132, 134, 136 to the available series, here Sex and the City, Sopranos, and The Wire, respectively. In this example the selection cursor 114 is positioned over the Sex and the City link 132, causing display of the available episodes, here Episode 1, Episode 2 and Episode 3, in a display section 138. As above, the selections 132-136, Episode 1, Episode 2, and Episode 3 are derived from one or more navigation catalogs and are superimposed over a video segment from the VOD Server 44. Here, the video segment includes the same logo section 102 as the selection menu 100 of FIG. 4. In addition, a title Original Series 140 is provided. The background may be the same or different colors than the background colors of the video segment 118.

Selection of the Sex and the City link 132 causes display of a selection menu 150, shown in FIG. 7. Here, the video segment comprises video in sections 152 and 154, animated text 156 music and audio voiceover. Other types of graphics may include spinning logos, for example. The video segment comprising the multiple types of graphics may be stored as a single asset. A selection section 158 for selection links, here Episode 1, Episode 2, and Episode 3, and a description section 159 to provide a description of a selected episode, are provided, as well. Selection links Episodes 1, 2 and 3 are superimposed on the selection section 156 of the video segment. Descriptive material for each episode may be displayed in the description section 158 when the selection cursor 114 is positioned over one of the episode links Episode 1, Episode 2, Episode 3. The selection links Episodes 1, 2, 3 and the descriptive material are also provided in navigation catalogs.

Selection of one of the episodes Episode 1, 2, 3, causes generation of control signals that are sent to headend 22 via an RDC channel, in accordance with a lightweight stream control protocol ("LSCP"), for example, as is known in the art. The VOD Server 44 reads the control signals and transmits the selected episode to the terminal 18-1 for display on the display device 61. The selected episode may be played in the same session as the navigation session, or the navigation session may be ended and a new session established for selected programs.

The navigation catalogs for a particular on demand service may be part of a single, group navigation catalog, that may be retrieved by the set-top terminal 18-1 from the carousel provided by the BFS Server 46, when the service is selected. FIG. 8 is an example of a group navigation catalog 160 for HBO On Demand, which contains all the navigation catalogs containing the selection options and descriptive material for HBO On Demand selection menus, such as the selection menus 100, 130 and 150. The relationship between the navigation catalogs is indicated by the outline structure of the navigation catalogs in FIG. 8. The outline structure is purely for illustrative purposes. A root navigation catalog is a navigation catalog within the group navigation catalog 160 that forms a main branch point of a navigation tree for a service. The root navigation catalog contains the selections and descriptive material for the initial on demand service selection screen. In this example, the root catalog is Catalog ID: 1. The descriptor for the selected on demand service in the Service Table (PSP ST) may also include a reference to the root navigation catalog for the initial selection screen. The root navigation catalog may thereby be retrieved to obtain the initial selection links and initial video segment, as described below.

Navigation catalogs may also be classified as a menu or selection navigation catalog. Menu navigation catalogs provide links to selections in other menu navigation catalogs or selection navigation catalogs. Selection navigation catalogs contain lists of available programs. Catalog ID:1 is a menu catalog as well as being the root navigation catalog. Catalog ID:4 is also a menu catalog. Catalog ID:1 contains selection links to Catalog ID:4 for Series and to selection catalogs Catalog ID:2, for Movies; Catalog ID:6, for Sports; and Catalog ID:9, for Extras. It is noted that Movies, Series, Sports and Extras are the selection links provided in the selection menu 100 of FIG. 4.

Menu Catalog ID:4 contains selection links to Selection Catalog ID:5, for use with the Sex and the City video segment in the selection menu 150 of FIG. 7; Catalog ID:7 contains selection links for a selection menu resulting from selection of Sopranos in selection menu 130 of FIG. 6; and Catalog ID:8 contains selection links for a selection menu resulting from selection of The Wire in selection menu 130. Selection Catalogs Catalog ID:5, Catalog ID:7 and Catalog ID:8 each include selection links to multiple episodes for Sex and the City, Sopranos and The Wire, respectively. The three episodes of Sex and the City shown in selection menu 150 are indicated within Catalog ID:5. Catalog ID:2 contains three movie selection links, for Two Weeks Notice, Terminator 3 and Harry Potter, respectively, for use with a selection menu resulting from the selection of Movies in FIG. 4. In order to select Sex and the City Episode 2, for example, a user would have to select the Series link, the Sex and the City link and then the Episode 2 link, on subsequent selection screens.

The On Demand Server 42 generates the navigation catalogs based on the metadata provided by the source 12-1 through 12-L with the package of assets comprising the video segments, for example. The respective sources 12-1 through 12-L of the programs, such as HBO On Demand, identify the selection path to the available programs in the metadata. For example, the source of HBO On Demand programming will specify that in order to select Episode 2 of Sex and the City, a user must select Series on an initial selection screen, and then Sex and the City and Episode 2 on subsequent selection screens. The sources 12-1 through 12-L will also identify which selection links are to be offered in the same selection screen. Navigation video segments are also correlated to respective selection screens. If new video segments are provided, the On Demand Server 42 can update or replace existing catalogs or create new catalogs, as needed. Similarly, if new selection links and/or programs are provided by the source 12-1 through 12-L, the On Demand Server 42 may add them to the appropriate catalog based on the selection path specified by the source. If a new series is added, the On Demand Server 42 may generate new menu and selection catalogs, as well as new selection screens, to accommodate the new series.

Figure 9:
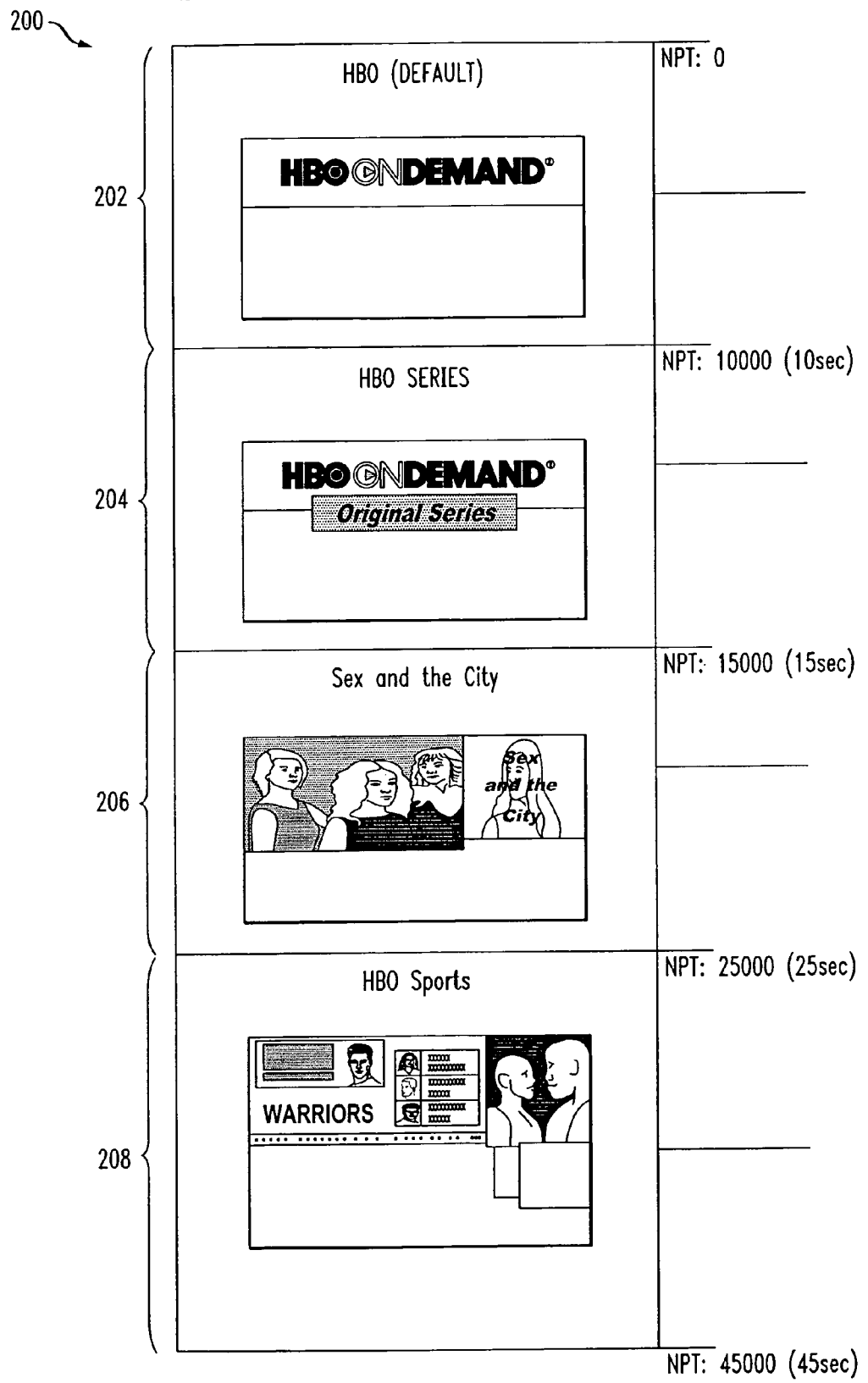
FIG. 9 is an example of a navigation playlist of navigation video segments for use in embodiments of the present invention.

As described above, the video segments for use with the selection menus are stored on the VOD Server 44 in the headend 22. In accordance with an embodiment of the invention, delivery of the video segments to the set-top terminal 18-1 in coordination with the selections of a user may be accomplished through a navigation playlist, such as navigation playlist 200 of FIG. 9. A playlist is a listing of content, as described in co-pending application Ser. No. 10/662,776, filed on Sep. 15, 2003, which is incorporated by reference herein. In embodiments of the present invention, the navigation playlist 200 comprises pointers to the navigation video segments for a particular on demand service. The navigation playlist preferably comprises pointers to all the video segments that may be used in the selection menus of that on demand service. As discussed above, the navigation video segments may be stored on the VOD Server 44. The navigation playlist 200 is generated by the On Demand Server 42 and is provided to the VOD Server 44. The VOD Server 44 may correlate the pointers in the playlist 200 to particular navigation video segments via a table, for example.

In this example, the navigation playlist 200 comprises segments 202, 204, 206, 208, corresponding to the video segments for HBO On Demand, Original Series, Sex and the City, discussed above, and also HBO Sports, respectively. The navigation playlist 200 is preferably indexed to allow the VOD Server 44 to locate different segments of content within the playlist. The playlist 200 may be indexed according to Normal Play Time ("NPT"), for example, which starts at zero, progresses in milliseconds, and contains no negative values. A length of time between an NPT start time and an NPT end time corresponds to the actual length of the corresponding video/audio asset. It is understood, however, that the NPT is an organizational tool. The NPT is an arbitrary index and any unique values may be used. The contents of the navigation playlist 200 is typically not broadcast in accordance with the NPT. Also, the video segments are shown in the playlist 200 for illustrative purposes only. In preferred embodiments of the invention, the video segments are not in the playlist, although that is possible.

The first segment 202 of the navigation playlist 200, which corresponds to the initial HBO On Demand video segment, starts at NPT:0 and ends at NPT:10000. The length of the HBO On Demand video segment is 10 seconds. This video segment may be requested by the set-top terminal 18-1 when the user selects the HBO On Demand service by selecting the appropriate channel, as discussed further below. It may also be a default video segment if there is no other video segment for a particular selection.

The second segment 204 is the Original Series video segment, which starts at NPT: 1000 and ends at NPT: 15000. The length of this video segment is 15 seconds. This video segment is retrieved and provided to the set-top terminal 18-1 when a user selects the Series link 108 on the selection menu 130, in order to be presented with the option of selecting an episode from a series such as Sex and the City or Sopranos, for example, as shown in FIG. 4.

The third segment 206 is the Sex and the City video segment, which starts at NPT: 15000 and ends at NPT:25000. The length of this video segment is 25 seconds. This video segment is retrieved and provided to the set-top terminal 18-1 when a user selects the Sex and the City link 132 on the selection menu 130, shown in FIG. 6.

The fourth segment is a Sports video segment, starting at NPT:25000 and ending at NPT:45000. The length of this video segment is 20 seconds. This video segment is retrieved and provided to the set-top terminal 18-1 when a user selects the Sports link 110 on the initial selection menu 100 of FIG. 4.

The playlist 200 is preferably generated by the On Demand Server 42 when a request is received to establish a session for an on demand service. In this way, if the source 12-1 through 12-L of the on demand service has updated their navigation video segments or selection options, then the playlist 200 will reflect the update. Alternatively, playlists 200 may be generated when the assets are received and updated, and stored for retrieval when an on demand session is requested.

The On Demand Server 42 may create the playlist 200 based on the metadata provided with pitched assets comprising the navigation video segments. Since the metadata identifies the source 12-1 through 12-L providing the asset, the On Demand Server 42 can identify the navigation video segments of a particular on demand service, for assembly into the playlist 200 when needed. The assembled playlist 200 is indexed, preferably by NPT number based on the length of each video segment.

Figure 10:
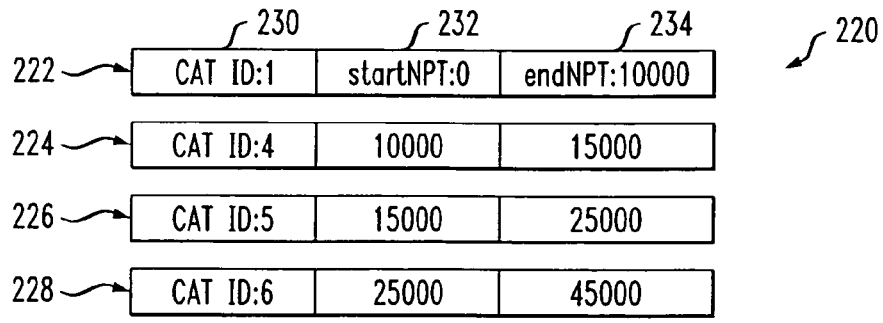
FIG. 10 is an example of a table of descriptors of available navigation video segments.

To enable identification of video segments by the set-top terminal 18-1 for delivery by the cable system 14, codes or descriptors are sent to the set-top terminal 18-1, and stored in the memory 66. The descriptors correlate Catalog ID numbers to NPT start and end times of the navigation playlist 200. FIG. 10 is an example of a table 220 of descriptors. The descriptors may be sent to the set-top terminal 18-1 by the On Demand Server 42 upon establishment of a session with the terminal.

The table 220 in this example comprises four descriptors 222, 224, 226, 228 for video segments corresponding to four navigation catalogs, Catalog ID:1 for HBO On Demand, Catalog ID:4 for Series, Catalog ID:5 for Sex and the City and Catalog ID:6 for Sports. Descriptors for all navigation catalogs are not provided in this example because video segments do not exist for all navigation catalogs in this example. In this example, no video segments, and therefore no descriptors, are provided for Catalog ID:2 (Movies), Catalog ID:7 (The Sopranos), Catalog ID:8 (The Wire) and Catalog ID:9 (Extras). As mentioned above, a default video segment, such as the initial HBO video segment (Catalog ID:1) used in selection screen 100, may be used when no other video segment is provided.

Each descriptor 222, 224, 226, 228 comprises a header 230 identifying the CAT ID No., which corresponds to the Catalog Number of the catalogs FIG. 8, an NPT start time 232 and an NPT end time 234. The NPT start time 232 and end time 234 correspond to the NPT start and end times of the video segments identified by the descriptor, on the navigation playlist 200. For example, the descriptor 222 for Catalog ID:1 for HBO On Demand comprises an NPT start time of NPT:0 and an NPT end time NPT:10000, as in the playlist 200. The descriptor 224 for Catalog ID:4 for Series comprises an NPT start time of 10000 and an NPT end time of 15000. The descriptor 226 for Catalog ID:5 for Sex and the City comprises an NPT start time of 15000 and an NPT end time of 25000. The descriptor 228 for Catalog ID:6 for Sports comprises an NPT start time of 25000 and an NPT end time of 45000.

The On Demand Server 42 may acquire the NPT start and end times for a respective descriptor of a video segment based on the position of the video segment in the playlist 200. The Catalog ID of the navigation catalog containing the selection links to be superimposed over a respective video segment may be determined from the metadata provided with the asset corresponding to the video segment. As discussed above, the On Demand Server 42 creates the navigation catalog based on the metadata associated with the assets. The On Demand Server 42 may correlate the created catalogs with the underlying video segments in a table, for example. The Catalog ID of a correlated navigation catalog may then be added to the descriptor for the video segment.

In this example, selection of a link causes the terminal 18-1 to search the table 220 for a descriptor corresponding to the Catalog ID of the navigation catalog providing the next set of selection links invoked by that selection. If the selection link is from Catalog ID: 1, 4, 5 or 6, then the set-top terminal 18-1 identifies the corresponding NPT start and end times for the video segment associated with the selection. The NPT start and end times are provided to the headend 22 via a RDC channel and a lightweight stream control protocol ("LSCP") to the VOD Server 44. The set-top terminal 18-1 may automatically request the initial navigation video segment (here Catalog ID:1, startNPT:0, endNPT:10000) after the service is selected and the list of descriptors of FIG. 10 is received, based on the Catalog ID associated with the root navigation catalog.

The VOD Server 44 identifies the video segment corresponding to the NPT start and end times on the navigation playlist 200 and provides that video segment to the terminal 18-1 along the established session, through the modulator bank 26. The MPEG decoder 65 receives and decodes the video segment, the processor 64 superimposes the next set of selections links and descriptive material on the video segment, and the video segment is displayed on the display device 61. If no descriptors are found corresponding to the navigation catalog of the selection, then the processor 64 retrieves the default video segment, such as the initial HBO On Demand video segment of FIG. 5b, which in this example is already stored in memory 66.

Figure 11:
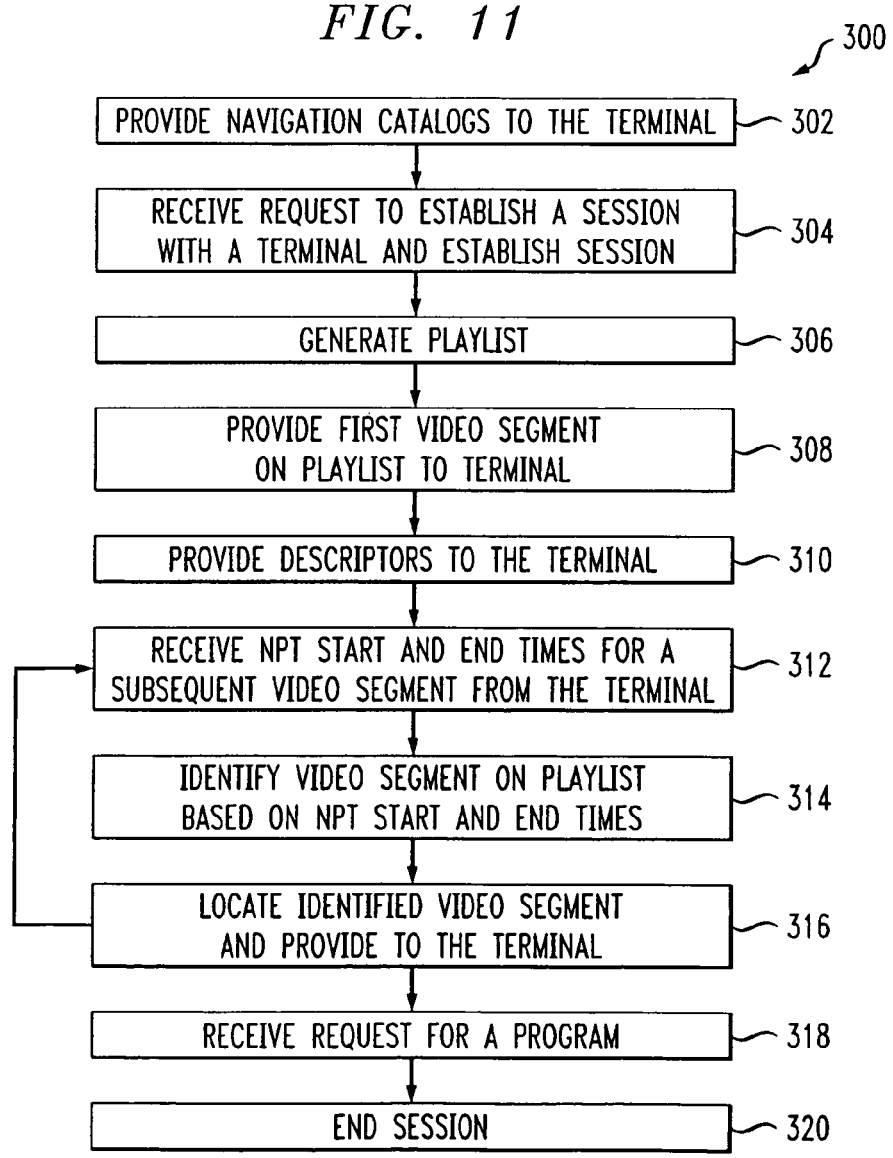
FIG. 11 is an example of a method enabling menu navigation of an on demand service provided by a communications system, such as cable system of FIG. 1, in accordance with an embodiment of the invention.

FIG. 11 is an example of a method 300 enabling menu navigation of an on demand service provided by a communications system, such as cable system 14, in accordance with an embodiment of the invention. As discussed above, a user may select an on demand service, such as HBO On Demand, by selecting an appropriate channel on a terminal, such as the set-top terminal 18-1, for example.

Navigation catalogs for the selected on demand service are provided to the terminal, in Step 302. As discussed above, the navigation catalogs may be provided by a FS Server 46 via a carousel delivery system, wherein all navigation catalogs for all available services are presented serially. After selection of an on demand or other available service, the terminal retrieves the group navigation catalog for the selected service from the carousel. As discussed above, in one example, descriptors for the group navigation catalogs associated with the available on demand and other such services are included in the Service Table (PSP ST) entry. The processor 66 can retrieve the proper group catalog for the selected on demand service based on the descriptor.

A request to establish a session is received and a session is established, in Step 304. The request may be received from the terminal 18-1 after the on demand service is selected. The On Demand Server 42 of the cable system 14 may receive the request and instruct the VOD Server 44 to allocate bandwidth to create the session with the terminal 18-1, for example. It will be apparent to one skilled in the art that certain steps of the method 300, such as the Steps 302 and 304, may take place simultaneously.

A navigation playlist is generated, in Step 306. The navigation playlist 200, which may be a listing of navigation video segments for the selected on demand service, may be generated by the On Demand Server 42 and provided to the VOD Server 44, for example. The playlist 200 may comprise pointers to the storage locations of the navigation video segments, for example.

A list of descriptors are prepared and provided to the terminal 18-1, in Step 308. The list of descriptors may be prepared based on the playlist. The descriptors are used by the terminal 18-1 to determine if a video segment is available for use with a particular selection of a user on a selection menu and to request the video segment. The descriptors may also contain reference to a catalog in which the subsequent selections to be superimposed on the video segment, are located. The descriptors may be in the form of the table 220 of FIG. 10, for example.

The NPT start and end times for the initial navigation video segment are received in Step 310. The NPT times may be received by the VOD Server 44, for example. The NPT start and end times for the initial navigation video segment are retrieved from the list of descriptors, based on the Catalog ID of the root navigation catalog, here Catalog ID: 1. As discussed above, the descriptor in the Service Table entry for the selected on demand service also contains a reference to the Catalog ID of the root catalog, enabling the processor to retrieve the initial selections and descriptive material, and superimpose them onto the initial video segment to form the initial selection screen 100, for example.

The initial navigation video segment is identified on the playlist based on the NPT start and end times, in Step 312, by the VOD Server 44, for example. The video segment is provided to the terminal via the session, in Step 314. The VOD Server 44 may locate the video segment via a pointer to that segment in the playlist 200. The VOD Server 44 then determines the storage location of the requested video segment based on a table correlating pointers from the playlist 200 to storage locations of respective video segments, and provides the video segment to the set-top terminal, such as terminal 18-1. The set-top terminal 18-1 may superimpose the selections from the appropriate navigation catalog over the video segment and display the resulting selection menu to the user.

After the list of descriptors and the initial navigation video segment are provided in Steps 308 and 310, Steps 310-314 may be repeated multiple times for other navigation video segments, whenever a user makes a selection leading to a subsequent selection for which a navigation video segment is available. An NPT start time and an NPT end time for that video segment is then received, in Step 310 and the corresponding video segment is identified on the playlist in Step 312 and located and provided to the terminal, in Step 314, as described above. The loop of Steps 310-314 ends when a program is selected for viewing, in Step 316. In this example, when a request for a program is received, in Step 316, the session is ended, in Step 320. A new session may be established to play the selected program. Alternately, the program may be provided in the current session, by appending the selected program to the playlist 200, for example.

FIGS. 12*a* and 12*b* is an example of a method 400 of operating a terminal coupled to a display device, such as the set-up terminal 18-1 coupled to a TV, in accordance with an embodiment of the invention.

A user selection of an on demand service is received, in Step 402. The selection may be made by selecting a channel on the set-top terminal 18-1 associated with the desired on demand service via a hand held remote control, for example.

Navigation catalogs for the selected on demand service are acquired and stored, in Step 404. The catalogs may be acquired by the processor 64 from a carousel of navigation catalogs provided by the FS Server 46 of the cable system 14, and stored in memory 66. The catalogs may be within a single navigation group catalog on the carousel, for example. The group catalog may be identified based on a Service Table entry for the selected on demand service, which contains a descriptor for group catalog of the selected service, as described above.

The terminal requests that a session be established with the cable system, in Step 406. The session may be established in accordance with the SSP protocol, as discussed above.

Descriptors are received and stored, in Step 408. Descriptors may be received by the processor 66 from the On Demand Server 42, as is discussed above with respect to Step 310 of the method 300, for example. The descriptors may be stored in the memory 66.

An initial video segment is requested and received, in Step 410. The initial video segment may be requested from the VOD Server 44 by sending the NPT start time and NPT end time for the initial video segment. In the example of FIG. 10, the NPT start time is 0 and the NPT end time is 10000. The NPT start and end times for the initial video segment may be identified from the descriptor list, based on the Catalog ID of the root navigation catalog.

Initial selection links are retrieved from a catalog, superimposed over the initial navigation video segment and displayed, in Step 412. The selections may be retrieved by the processor 66 from a root catalog containing the initial selections for the selected on demand system, such as CAT ID:1 HBO in FIG. 8, which is now stored in the memory 66. The method 400 continues in FIG. 12*b*.

A selection of an option on the initial selection menu is received, the descriptor associated with that option is identified and the descriptor is compared to the received descriptors, in Step 414. If the selection's descriptor is not one of the received descriptors, in Step 416, a default video segment is retrieved, in Step 420. The default video segment may be retrieved from the memory 66 by the processor 64. The default video segment may be the initial video segment, which has already been provided in Step 412, for example. The processor 64 may perform these steps.

If the descriptor is found on the descriptor list, in Step 416, a request is made for the video segment corresponding to that descriptor, in Step 422. The video segment is received in Step 424. The processor 64 requests the video segment from the cable system 14, as discussed above.

The set-top terminal 18-1 retrieves corresponding selection links, superimposes them over the video segment (either the default video segment from Step 420 or the video segment received from the cable system 14 in Step 424) and displays the resulting selection menu, in Step 426, to allow for user selection of options.

A subsequent selection is received, in Step 428. The selection may be entered through the current selection menu. If it is determined that the selection is not a program selection, in Step 430, then the method 400 returns to Step 416. Steps 416 through 430 are repeated until it is determined that a program has been selected, in Step 430. The processor 66 may determine that a program has been selected based on the type of catalog the selection is derived from. If the selection is derived from a selection catalog, such as Episode 1, 2 or 3 from Catalog ID:5 for Sex and the City, the selection is of a program. If the selection is from a menu catalog, such as Sex and the City from Catalog ID:4 for Series, then the selection is not a program, but a link to other selection options. (See FIG. 8).

Once a program is selected, the program is requested from the cable system 14, in Step 432.

While the discussion above is primarily concerned with providing video segments for selection menus of on demand services, such as HBO On Demand, the methods and systems of the present invention may be used in any type of program service where selection menus are presented to a user on a display device via a terminal.

The systems disclosed herein are in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The foregoing merely illustrates the principles of the invention. It will thus be appreciated that those skilled in the art will be able to devise numerous other arrangements which embody the principles of the invention and thus are within the spirit and scope of the invention, which is defined in the claims, below.

What is claimed is:

1. A method of operating a communications system, the method comprising:
   receiving, from a terminal, a selection of a video-on-demand service;
   responsive to receiving said selection of said video-on-demand service, providing, to the terminal, at least one navigation catalog corresponding to said selection of said video-on-demand service, said at least one navigation catalog comprising a plurality of selection links, said at least one navigation catalog being provided to the terminal over a data link of said communications system;
   subsequent to said selection of said video-on-demand service, receiving a request for establishment of a session from the terminal;
   responsive to said request for said establishment of said session, establishing the session with the terminal by establishing a video-on-demand link separate from said data link;
   generating a navigation playlist comprising an indexed listing of a plurality of navigation video segments, the navigation playlist comprising pointers to storage locations of the navigation video segments, the storage locations being in a video-on-demand server in a head end of the communications system, the video-on-demand server being remote from the terminal, wherein the communications system provides at least said video-on-demand service to the terminal;
   providing, to the terminal, via said video-on-demand link, an initial one of the navigation video segments listed in the navigation playlist, for the terminal to construct and display an initial selection menu allowing further menu navigation, by having the terminal superimpose initial ones of said selection links on said initial one of said navigation video segments;
   receiving, at the terminal, a selection from among the initial ones of the selection links from the initial selection menu formed by the terminal superimposing the initial ones of the selection links on the initial one of the navigation video segments;
   responsive to the selection from the initial selection menu, providing, to the terminal, via said video-on-demand link, a subsequent one of the navigation video segments listed in the navigation playlist, for the terminal to construct and display a subsequent selection menu allowing program selection, by having the terminal superimpose subsequent ones of said selection links on said subsequent one of said navigation video segments;
   receiving, at the terminal, a request for a program via a selection made from the subsequent selection menu formed by the terminal superimposing the subsequent ones of the selection links on the subsequent one of the navigation video segments; and
   responsive to receiving said request from the terminal via a reverse data link, transmitting the program to the terminal for viewing;
   wherein the navigation video segments of the playlist are separate and distinct from the program.

2. The method of claim 1, comprising establishing the session, at least in part, by:
   allocating bandwidth for communication with the terminal.

3. The method of claim 1, comprising:
   generating the navigation playlist indexed by normal play time (NPT).

4. The method of claim 1, further comprising:
   providing a descriptor for each available one of the navigation video segments to the terminal, wherein each descriptor comprises an identification of an index value of a respective one of the navigation video segments, and wherein the descriptors are provided as a list of descriptors prepared based on the navigation playlist.

5. The method of claim 1, comprising:
   providing the at least one navigation catalog via a carousel.

6. The method of claim 4, further comprising:
   receiving a request for the subsequent one of the navigation video segments from the terminal, the request comprising the indexed value of the subsequent one of the navigation video segments; wherein the subsequent one of the navigation video segments is provided to the terminal in accordance with the indexed value.

7. The method of claim 1, wherein the navigation video segments comprise media rich graphics.

8. The method of claim 1, wherein said subsequent selection menu affords multiple program choices.

9. The method of claim 1, wherein the navigation video segments of the playlist are separate and distinct from the program in that the program is appended to the playlist after the step of receiving the request for the program.

10. The method of claim 1, wherein the navigation video segments of the playlist are separate and distinct from the program in that the step of transmitting the program is carried out in a new session, different than the session established in the establishing step.

11. The method of claim 1, wherein:
the initial one of the navigation video segments comprises a default video segment;
the navigation playlist is generated in response to the request to establish the session, based on the selected video-on-demand service;
said data link of said communications system comprises an out-of-band link;
said video-on-demand link comprises allocated in-band bandwidth;
said reverse data link comprises a reverse data channel; and
the step of providing the subsequent one of the navigation video segments to form the subsequent selection menu comprises:
responsive to the selection from the initial selection menu, providing, to the terminal, another subsequent one of the navigation video segments listed in the navigation playlist, for display, at the terminal, with additional subsequent ones of the selection links superimposed thereon, to form another subsequent selection menu, the another subsequent selection menu allowing further menu navigation;
receiving, at the terminal, a selection from among the additional subsequent ones of the selection links from the another subsequent selection menu formed by superimposing the additional subsequent ones of the selection links on the another subsequent one of the navigation video segments; and
responsive to the selection from the another subsequent selection menu, providing, to the terminal, the subsequent one of the navigation video segments to form the subsequent selection menu.

12. The method of claim 11, wherein, in said transmitting step, said program affords a video-on-demand viewing experience with pause, fast forward, and rewind capability.

13. A communications system for communication with a remote terminal, said system comprising:
a head end, said head end in turn comprising:
at least one processor; and
at least one memory coupled to said at least one processor, said at least one processor being programmed to:
receive, from the terminal, a selection of a video-on-demand service;
responsive to receiving said selection of said video-on-demand service, provide, to the terminal, at least one navigation catalog corresponding to said selection of said video-on-demand service, said at least one navigation catalog comprising a plurality of selection links, said at least one navigation catalog being provided to the terminal over a data link of said communications system;
establish a session with the remote terminal, upon request by the remote terminal, the request being subsequent to the selection of the video-on-demand service, the session being established in response to the request, the session being established by establishing a video-on-demand link separate from said data link;
generate a navigation playlist comprising an indexed listing of a plurality of navigation video segments, said navigation playlist comprising pointers to storage locations of said video segments, said storage locations being in said at least one memory, wherein said communications system provides at least video-on-demand service to the remote terminal;
provide, to the terminal, via said video-on-demand link, an initial one of said navigation video segments listed in said navigation playlist, for the terminal to construct and display an initial selection menu allowing further menu navigation, by having the terminal superimpose initial ones of said selection links on said initial one of said navigation video segments;
based on a selection received at the terminal from among said initial ones of said selection links from said initial selection menu formed by the terminal superimposing said initial ones of the selection links on said initial one of the navigation video segments, provide, to the terminal, via said video-on-demand link, a subsequent one of said navigation video segments listed in said navigation playlist, for the terminal to construct and display a subsequent selection menu allowing program selection, by having the terminal superimpose subsequent ones of said selection links on said subsequent one of said navigation video segments;
receive a request for a program from the terminal, based on a selection made, at the terminal, from said subsequent selection menu formed by the terminal superimposing said subsequent ones of said selection links on said subsequent one of said navigation video segments; and
responsive to receiving said request from the terminal via a reverse data link, transmit said program to the terminal for viewing;
wherein said navigation video segments of said playlist are separate and distinct from said program.

14. The system of claim 13, wherein the at least one processor is programmed to:
establish the session by, at least in part, allocating bandwidth for communication with the terminal.

15. The system of claim 13, wherein the at least one processor is further programmed to:
generate the navigation playlist indexed by normal play time (NPT).

16. The system of claim 13, wherein the at least one processor is further programmed to:
provide a descriptor for each available one of the navigation video segments to the terminal, wherein each descriptor comprises an identification of an index value of a respective one of the navigation video segments, and wherein the descriptors are provided as a list of descriptors prepared based on the navigation playlist.

17. The system of claim 13, further comprising a carousel coupled to said head end, wherein the at least one processor is further programmed to:
provide the at least one navigation catalog via the carousel.

18. The system of claim 16, wherein the at least one processor receives a request for the subsequent one of the navigation video segments from the terminal, the request comprising the indexed value of the subsequent one of the navigation video segments, the at least one processor being further programmed to:
provide the subsequent one of the navigation video segments to the terminal in accordance with the indexed value.

19. The system of claim 18, wherein the head end comprises:

a first server; and a second server in communication with the first server, wherein the navigation video segments are stored by the second server;

wherein:

the first server is programmed to generate the navigation playlist and provide the navigation playlist to the second server; and the second server is programmed to:

identify the subsequent one of the navigation video segments from the navigation playlist;

retrieve the subsequent one of the navigation video segments; and provide the subsequent one of the navigation video segments to the terminal via the session.

20. The system of claim 19, further comprising:

a carousel coupled to said head end; and a third server programmed to provide the at least one navigation catalog to the terminal via the carousel.

21. The system of claim 14, wherein the navigation video segments comprise media rich graphics.

22. The system of claim 13, wherein said subsequent selection menu affords multiple program choices.

23. The system of claim 13, wherein the navigation video segments of the playlist are separate and distinct from the program in that the at least one processor is operative to append the program to the playlist after the at least one processor receives the request for the program.

24. The system of claim 13, wherein the navigation video segments of the playlist are separate and distinct from the program in that the at least one processor is operative to transmit the program in a new session, different than the session established upon the request by the terminal.

25. The system of claim 13, wherein:

the initial one of the navigation video segments comprises a default video segment;

the navigation playlist is generated in response to the request to establish the session, based on the selected video-on-demand service;

said data link of said communications system comprises an out-of-band link;

said video-on-demand link comprises allocated in-band bandwidth;

said reverse data link comprises a reverse data channel; and the at least one processor is programmed to provide the subsequent one of the navigation video segments to form the subsequent selection menu by:

responsive to the selection from the initial selection menu, providing, to the terminal, another subsequent one of the navigation video segments listed in the navigation playlist, for display, at the terminal, with additional subsequent ones of the selection links superimposed thereon, to form another subsequent selection menu, the another subsequent selection menu allowing further menu navigation; and based on a selection, received at the terminal, from among the additional subsequent ones of the selection links from the another subsequent selection menu formed by superimposing the additional subsequent ones of the selection links on the another subsequent one of the navigation video segments, providing, to the terminal, the subsequent one of the navigation video segments to form the subsequent selection menu.

26. The system of claim 25, wherein said program affords a video-on-demand viewing experience with pause, fast forward, and rewind capability.

27. A terminal to (i) receive programming from a head end remote from the terminal, the head end having a video-on-demand server, and to (ii) display the programming on a display, the terminal comprising:

a processor; and a memory coupled to the processor;

wherein the processor is programmed to:

transmit, to the head end, a selection of a video-on-demand service;

receive, from the head end, at least one navigation catalog comprising a plurality of selection links, the navigation catalog being received in response to the selection of the video-on-demand service and corresponding to the selection of the video-on-demand service, the navigation catalog being provided to said terminal over a data link of the communications system;

subsequent to said selection of said video-on-demand service, request establishment of a session between the head end and the terminal, the session being established via a video-on-demand link separate from the data link;

store in said memory an initial navigation video segment received via the session over the video-on-demand link, the initial navigation video segment comprising an initial one of a plurality of navigation video segments listed in a navigation playlist generated in the head end, the navigation playlist comprising an indexed listing of the plurality of navigation video segments, the navigation playlist comprising pointers to storage locations of the plurality of navigation video segments, the storage locations being in the video-on-demand server;

generate and display an initial selection menu allowing further menu navigation, by superimposing initial ones of the selection links on the initial navigation video segment;

receive a selection from among the initial ones of the selection links from the initial selection menu;

responsive to the selection from the initial selection menu, request, from the head end, a subsequent one of the navigation video segments listed in the navigation playlist;

receive, from the head end, over the video-on-demand link, the subsequent one of the navigation video segments listed in the navigation playlist;

generate and display a subsequent selection menu allowing program selection, by superimposing subsequent ones of the selection links over the subsequent one of the navigation video segments;

receive a request for a program, via a selection made from the subsequent selection menu;

transmit a request for the program to the head end via a reverse data link; and receive said program from the head end for viewing, in response to said request;

wherein said navigation video segments of said playlist are separate and distinct from said program.

28. The terminal of claim 27, wherein the processor is programmed to:

tune to a bandwidth allocated during establishment of the session, to receive the at least one navigation video segment.

29. The terminal of claim 27, wherein:

a plurality of descriptors are received from the head end to identify the plurality of navigation video segments, the descriptors being prepared based on the navigation playlist generated in the head end;

the processor is programmed to:

request the subsequent one of the navigation video segments based on a given one of the plurality of descriptors; and identify the given one of the plurality of descriptors based on the selection from the initial selection menu.

30. The terminal of claim 27, wherein said subsequent selection menu affords multiple program choices.

31. The terminal of claim 27, wherein the navigation video segments of the playlist are separate and distinct from the program in that the program is appended to the playlist after the processor receives the request for the program.

32. The terminal of claim 27, wherein the navigation video segments of the playlist are separate and distinct from the program in that the program is received from the head end in a new session, different than the session established upon the request by the terminal.

33. The terminal of claim 27, wherein:
the initial navigation video segment comprises a default video segment;
the navigation playlist is generated in response to the request to establish the session, based on the requested video-on-demand service;
said data link of said communications system comprises an out-of-band link;
said video-on-demand link comprises allocated in-band bandwidth;
said reverse data link comprises a reverse data channel; and
the processor is programmed to request the subsequent one of the navigation video segments to form the subsequent selection menu by:
responsive to the selection from the initial selection menu, requesting, from the head end, another subsequent one of the navigation video segments listed in the navigation playlist;
receiving, from the head end, the another subsequent one of the navigation video segments listed in the navigation playlist;
generating another subsequent selection menu allowing further menu navigation, by superimposing additional subsequent ones of the selection links over the another subsequent one of the navigation video segments;
receiving a selection from among the additional subsequent ones of the selection links from the another subsequent selection menu; and
responsive to the selection from the another subsequent selection menu, requesting, from the head end, the subsequent one of the navigation video segments to form the subsequent selection menu.

34. The terminal of claim 33, wherein said program affords a video-on-demand viewing experience with pause, fast forward, and rewind capability.

35. A method of operating a terminal coupled to a head end, remote from the terminal, and a display device, the method comprising:
transmitting, to the head end, a selection of a video-on-demand service;
receiving, from the head end, at least one navigation catalog comprising a plurality of selection links, the navigation catalog being received in response to the selection of the video-on-demand service and corresponding to the selection of the video-on-demand service, the navigation catalog being provided to said terminal over a data link of the communications system;
subsequent to said selection of said video-on-demand service, requesting establishment of a session with the head end, the session being established via a video-on-demand link separate from the data link;
receiving an initial navigation video segment via the session over the video-on-demand link, the initial navigation video segment comprising an initial one of a plurality of navigation video segments listed in a navigation playlist generated in the head end, the navigation playlist comprising an indexed listing of the plurality of navigation video segments, the navigation playlist comprising pointers to storage locations of the plurality of navigation video segments, the storage locations being in a video-on-demand server;
generating an initial selection menu allowing further menu navigation, by superimposing initial ones of the selection links over the initial navigation video segment;
displaying the initial selection menu;
receiving a selection from among the initial ones of the selection links from the initial selection menu;
responsive to the selection from the initial selection menu, requesting, from the head end, a subsequent one of the navigation video segments listed in the navigation playlist;
receiving, from the head end, over the video-on-demand link, the subsequent one of the navigation video segments listed in the navigation playlist;
generating and displaying a subsequent selection menu allowing program selection, by superimposing subsequent ones of the selection links over the subsequent one of the navigation video segments;
receiving a request for a program, via a selection made from the subsequent selection menu;
transmitting a request for the program to the head end via a reverse data link; and
receiving said program from the head end for viewing, in response to said request;
wherein said navigation video segments of said playlist are separate and distinct from said program.

36. The method of claim 35, wherein said subsequent selection menu affords multiple program choices.

37. The method of claim 35, wherein the navigation video segments of the playlist are separate and distinct from the program in that the program is appended to the playlist after the step of transmitting the request for the program.

38. The method of claim 35, wherein the navigation video segments of the playlist are separate and distinct from the program in that the step of receiving the program is carried out in a new session, different than the session established responsive to the requesting step.

39. The method of claim 35, wherein:
the initial navigation video segment comprises a default video segment;
the navigation playlist is generated in response to the request to establish the session, based on the requested video-on-demand service;
said data link of said communications system comprises an out-of-band link;
said video-on-demand link comprises allocated in-band bandwidth;
said reverse data link comprises a reverse data channel; and
the step of requesting the subsequent one of the navigation video segments to form the subsequent selection menu comprises:
responsive to the selection from the initial selection menu, requesting, from the head end, another subsequent one of the navigation video segments listed in the navigation playlist;
receiving, from the head end, the another subsequent one of the navigation video segments listed in the navigation playlist;
generating another subsequent selection menu allowing further menu navigation, by superimposing additional subsequent ones of the selection links over the another subsequent one of the navigation video segments;
receiving a selection from among the additional subsequent ones of the selection links from the another subsequent selection menu; and
responsive to the selection from the another subsequent selection menu, requesting, from the head end, the subsequent one of the navigation video segments to form the subsequent selection menu.

40. The method of claim 39, wherein, in said receiving step, said program affords a video-on-demand viewing experience with pause, fast forward, and rewind capability.

* * * * *